United States Patent [19]

Fischer

[11] 3,964,230

[45] June 22, 1976

[54] EXPANSION ANCHOR DEVICE

[76] Inventor: Artur Fischer, Altheimer Strasse 219, D-7241 Tumlingen, Germany

[22] Filed: July 29, 1974

[21] Appl. No.: 492,733

[30] Foreign Application Priority Data

July 30, 1973 Germany...................... 7327898[U]

[52] U.S. Cl.................................. 52/698; 248/300; 248/317
[51] Int. Cl.²...................... E04C 5/12; E04C 5/16; B42F 13/00
[58] Field of Search...................... 52/512, 712–714, 52/698, 704; 85/74, 75; 248/58, 59, 300, 317

[56] References Cited
UNITED STATES PATENTS

| | | | |
|---|---|---|---|
| 525,222 | 8/1894 | Levering | 85/75 |
| 979,853 | 12/1910 | Hartshorn | 85/75 |
| 2,699,312 | 1/1955 | Di Cesare | 52/698 |
| 3,185,424 | 5/1965 | Sloop | 248/300 |
| 3,218,771 | 11/1965 | Horn | 52/713 |
| 3,243,931 | 4/1966 | Becherer | 52/714 |
| 3,339,449 | 9/1967 | Lerich | 85/75 |
| 3,570,021 | 3/1971 | Watson | 85/75 |

Primary Examiner—Ernest R. Purser
Assistant Examiner—James L. Ridgill, Jr.
Attorney, Agent, or Firm—Michael J. Striker

[57] ABSTRACT

An expansion anchor sleeve has a leading end and a trailing end, and an expander member is located at the leading end. A threaded member extends through the expansion sleeve and is connected with the expander member in order to draw the latter into the leading end of the sleeve to expand the sleeve. The threaded member has a portion projecting outwardly from the trailing end of the sleeve and a sheet-material bracket surrounds this portion and has a plane aligned with a longitudinal axis of the threaded member. The bracket is formed with apertures.

4 Claims, 1 Drawing Figure

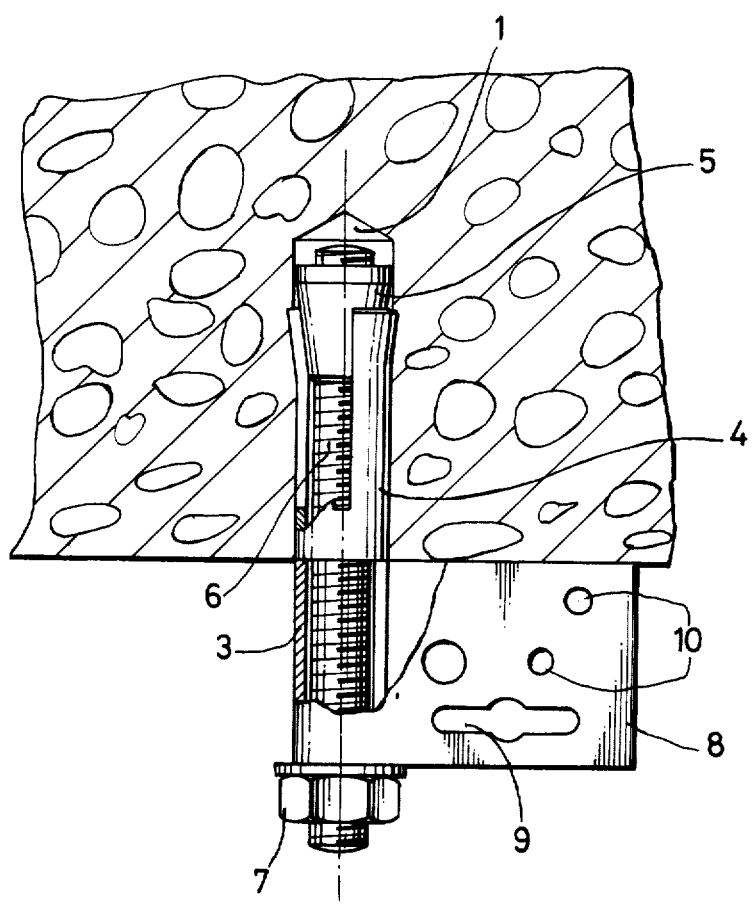

EXPANSION ANCHOR DEVICE

BACKGROUND OF THE INVENTION

The present invention relates generally to an expansion anchor device, and more particularly to an expansion anchor device which is especially suitable for installing of suspended ceilings and the like.

Prior-art expansion anchors are not readily suitable for installing suspended ceilings, for mounting suspended pipes and the like, because the anchoring operations required are not particularly simple, and the devices do not anchor the ceilings, pipes, or other elements as securely as desirable. More particularly, none of these anchoring devices provide any way in which the carrying straps, bracing wires or the like for holding the suspended ceilings, pipes and the like, may be connected.

SUMMARY OF THE INVENTION

Accordingly, it is an object of the invention to provide an expansion anchor device of the type in question, which affords the desired advantages.

More particularly, it is an object of the present invention to provide such an expansion anchor device which is particularly suitable for mounting suspended ceilings, pipes and other elements, and which is provided with means to which the mounting elements of the ceilings, pipes and the like can be connected.

In keeping with these objects, and with others which will become apparent hereafter, one feature of the invention resides in an expansion anchor device which, briefly stated, comprises an expansion sleeve having a leading end and a trailing end. An expander member is located at the leading end, and a threaded member extends through the expansion sleeve and is connected with the expander member in order to draw the latter into the leading end to expand the sleeve. The threaded member has a portion projecting outwardly from the trailing end, and a sheet-material bracket surrounds this portion and has a plane aligned with a longitudinal axis of the threaded member. The bracket is formed with apertures for connection of the connecting elements of the suspended component, such as a ceiling or the like.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

The single FIGURE is an axial section illustrating an embodiment of the invention.

DESCRIPTION OF THE PREFERRED EMBODIMENTS

Referring to the drawing it will be seen that reference numeral 1 identifies a bore hole or the like of a support member 2, such as a ceiling, from which another element —for example a suspended ceiling, a pipe, a duct or the like— is to be hung. Anchored in this bore 1 is the novel expansion anchor device 3 which has a tubular expansion sleeve 4 that is inserted into the bore 1. Located at the leading end of the sleeve 4, that is the end which is first inserted into the bore 1, is an expander member 5 of conical shape. A screw-threaded expander member 6 extends through the sleeve 4, being engaged with the expander member 5 and having a trailing end which projects beyond the trailing end of the sleeve 4 and onto which a nut 7 is threaded.

According to the invention, a sheet material —usually sheet metal— bracket 8 is provided, in part surrounding that portion of the threaded member 6 which projects past the trailing end of the sleeve 4, so as to be located between this trailing end of the sleeve 4 and the nut 7. The general plane of the bracket 8 is aligned with the longitudinal axis of the member 6. One side of the bracket 8 is bent in tubular form, to form a passage through which the exposed portion of the member 6 extends. The bracket 8 is provided with apertures, for instance slots 9 and/or bores 10, into which can be inserted —or to which can be otherwise suitably connected— strips, wires or other connecting elements of a suspended ceiling, pipe or the like which is to be hung from the support 2. It is evident that when the device 3 is in place, the nut 7 is turned and, since it abuts against the bracket 8, which in turn abuts against the trailing end of the sleeve 4, the expander member 5 is drawn into the leading end of the sleeve 4 and expands the same into firm frictional engagement with the material of the support 2 that surrounds the bore 1. The force of reaction which occurs when the member 5 is drawn into the sleeve 4 to expand the latter, is absorbed by the bracket 8 which is in turn supported by the nut 7. The reliability of the anchorage is assured due to the fact that the degree of expansion, and thus the degree of firmness of the anchorage, depends on the torque being applied. This means that particularly when a predetermined torque has been reached, the desired anchorage action corresponding to the predetermined torque is also obtained. This is irrespective of the distance to which the member 5 has been drawn into the sleeve 4.

By virtue of its location between the trailing end of the sleeve 4 on the one hand, and the nut 7 on the other hand, the bracket 8 is an integrated component of the expansion anchor device 3, and any supporting or mounting means of the component to be suspended —e.g. a suspended ceiling, pipe or the like— can be directly connected to the bracket via the apertures.

It is a substantial advantage of the device according to the present invention that it permits direct control of the degree of anchorage in the support 2, as a function of the degree of torque applied to the nut 7, and that it makes it possible to subsequently —that is after anchoring— to increase the degree of anchorage still further by further tightening the nut 7 if this should become necessary. This is in direct contradistinction to a prior-art teaching according to which once the sleeve has been driven onto an expansion cone located in the bore 1, and has thereby been expanded, it is not possible to directly determine whether the necessary and desired anchoring action has in fact been obtained. In this prior art, should a defect in the effectiveness of anchorage be found, it is not possible to further increase the degree of anchorage as is the case in the present invention.

It should be understood that the embodiment illustrated in the single FIGURE can be modified without departing from the scope of the invention. Thus, it is possible e.g. to have the bracket 8 arranged centrally with respect to the threaded member 6, or to provide perforations on both sides of the member 6 in the bracket 8. Also, the bracket may be extended outwardly beyond the free end of the member 6, and a perforation may then be arranged in the bracket symmetrically with reference to member 6. Furthermore, the nut 7 could be located in a recess provided in the bracket 8, in such a manner that the nut 7 would be flush with the bracket 8. In this case, the nut would then be turned together with the bracket 8, for which purpose the bracket 8 would be provided with a recess in a side edge, so that it can be readily turned without interferring with adjacent components. The depression in which the nut is located would of course have to be mating or substantially mating with respect to the configuration of the nut.

It will be understood that each of the elements described above, or two or more together, may also find a useful application in other types of constructions differing from the types described above.

While the invention has been illustrated and described as embodied in an expansion anchor device, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An expansion anchor device comprising, in combination, an expansion sleeve having a leading end and a trailing end; an expander member located at said leading end of said expansion sleeve; a threaded member having an axis and coaxially extending through said expansion sleeve and connected with said expander member for drawing the latter into said leading end of said expansion sleeve to expand the same, said threaded member having a portion projecting outwardly from said trailing end of said expansion sleeve; a nut threaded onto said projecting portion; and a sheet metal bracket having a bent first portion circumferentially bounding a passage for coaxially receiving said projecting portion of said threaded member intermediate said nut and said trailing end of said expansion sleeve, and at least one second portion rigidly connected to said first portion and located in a general plane which is substantially parallel to said axis, said second portion being formed with apertures for connecting thereto a component to be attached to a support in which said device is anchored.

2. A device as defined in claim 1, wherein said apertures are slot-shaped openings.

3. A device as defined in claim 1, wherein said apertures are bores.

4. A device as defined in claim 1, wherein said apertures comprise slot-shaped openings and bores.

* * * * *